Nov. 12, 1929.  M. BEBENSEE ET AL  1,735,104
SEED THRASHER
Filed Dec. 9, 1926  3 Sheets-Sheet 1

Will C. Children
Max Bebensee
Mervin Martin.

INVENTORS.

BY *Clem. F. Kimball*

ATTORNEY.

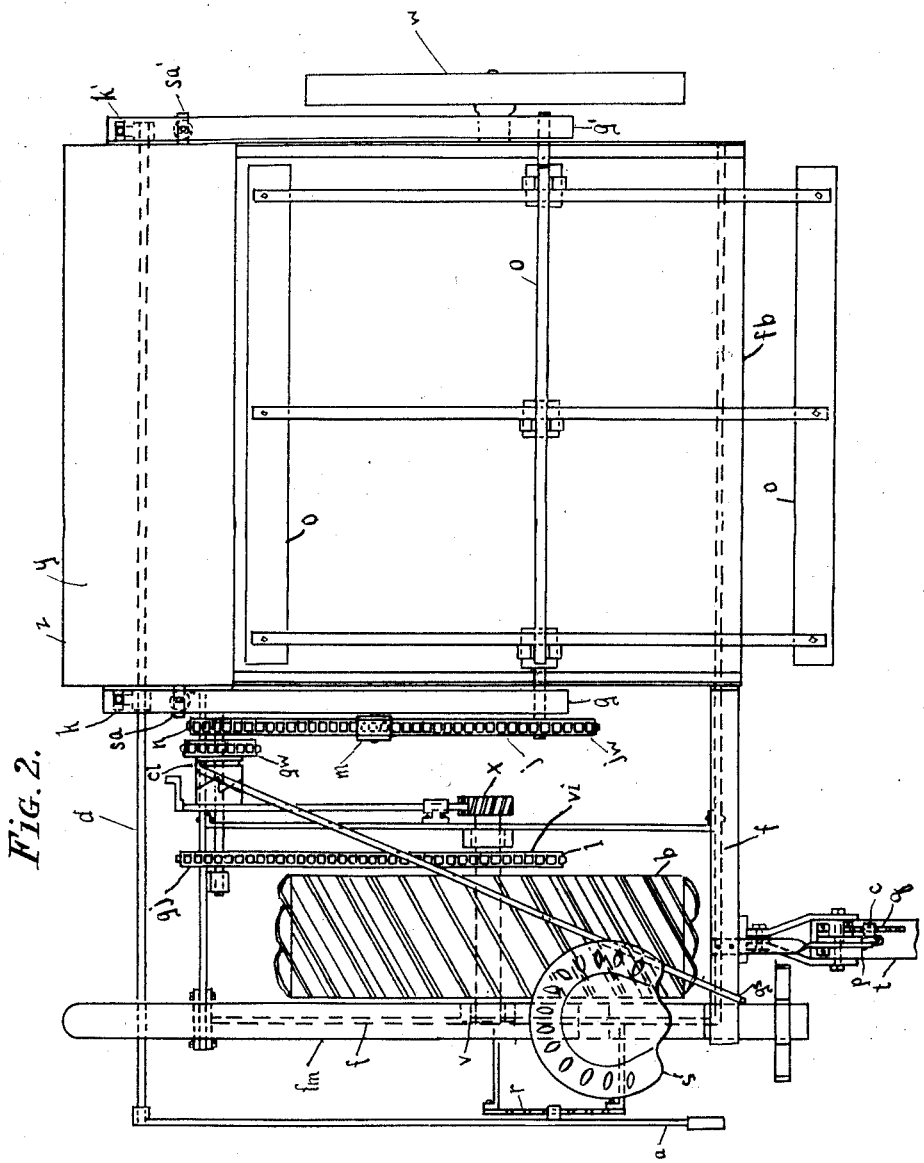

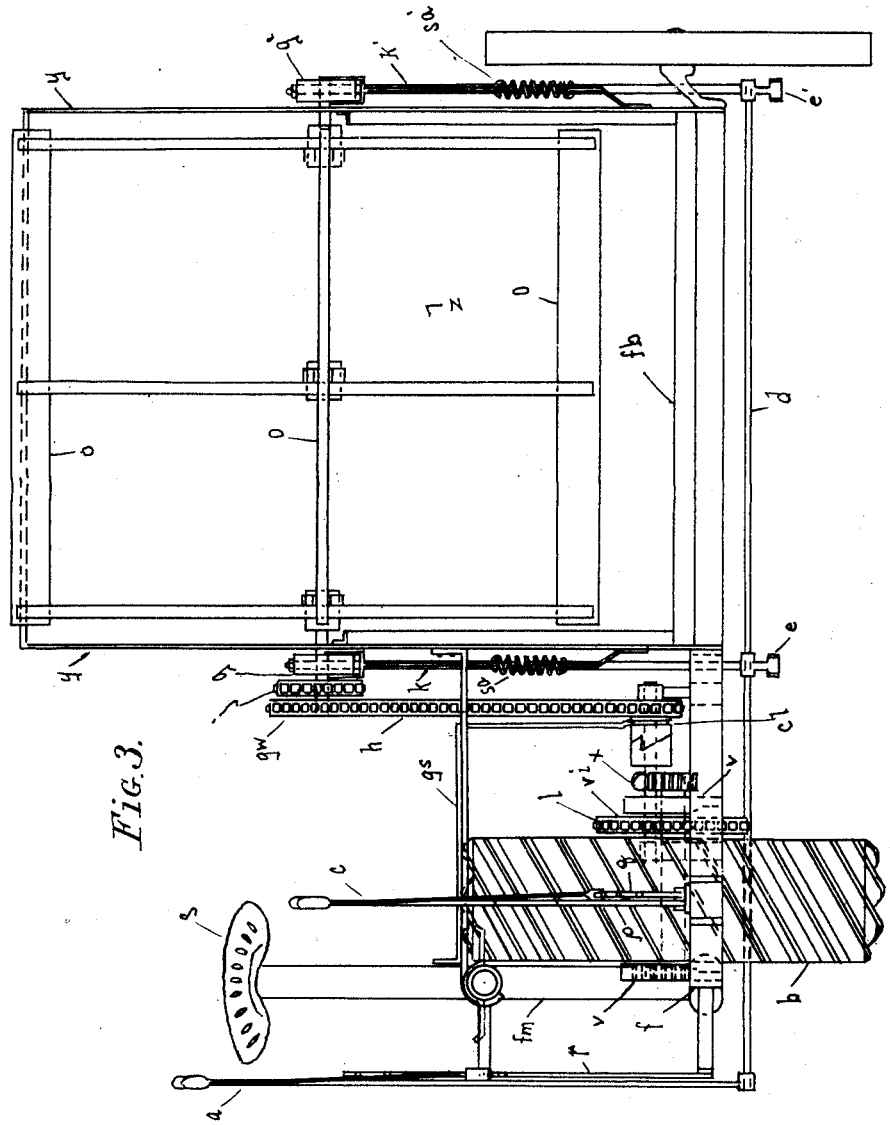

Patented Nov. 12, 1929

1,735,104

UNITED STATES PATENT OFFICE

MAX BEBENSEE AND WILL C. CHILDREN, OF COUNCIL BLUFFS, AND MERVIN MARTIN, OF HANCOCK, IOWA

SEED THRASHER

Application filed December 9, 1926. Serial No. 153,703.

My invention relates to improvements in seed thrashing machines in which a horizontal reel operates in conjunction with a striking bar; and the objects of my improvements are, first, to provide a means for knocking off the seeds of growing and uncut plants; second, to provide facilities for raising and lowering the striking bar; third, to afford adjustment of the flail blades to proper contact with the seed pods; fourth, to provide a means for catching and holding the seed knocked off; and, fifth, to provide a means for unloading the seed readily from the machine.

I attain these objects by the mechanism illustrated in the accompanying drawing, in which—

Fig. 2 is a front elevation of the same.

Fig. 3 is a plan view of the seed thrasher.

Similar letters refer to similar parts throughout the several views.

Figure 1:
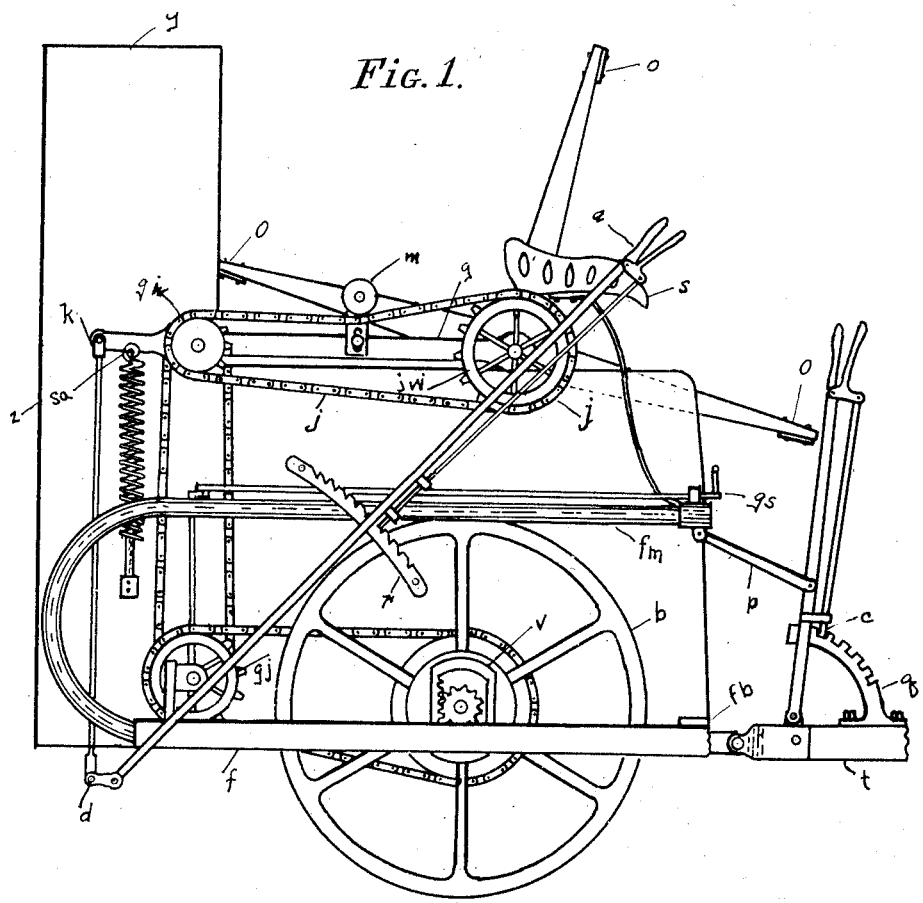
Fig. 1 is a side elevation of a seed thrasher constructed in accordance with the present invention.

An ordinary harvester wheel $b$ is employed, which wheel runs on adjustable axle, the axle having the gear $xw$ engaging the curved rack $bw$ so as to lower the frame $f$ by reason of a spiral or worm $x$ operated by the crank $n$. Attached to the frame $f$ at the opposite end is the wheel $w$ which supports the outer end. Resting upon the frame $f$ is a box or space $y$ which is adapted to hold the seed and portions of the plants beaten off by the reel. A reel having the arm pieces $o$ $o$, etc., is arranged to revolve in two arms supported on a pivot $tn$. At $m$ and $m'$ on the pivot $tn$ is supported two sprocket wheels $gw$, one of them carrying a chain $j$ running to the sprocket wheel $jw$ on the reel shaft $z$. An adjustable idler $m$ is provided to tighten the chain $j$. The chain $h$ connects the sprocket wheel $gw$ to the sprocket wheel $cw$ upon the counter shaft $cr$. The sprocket wheel $cw$ is arranged to engage by suitable clutch another sprocket wheel $gj$ on the shaft $cr$. The sprocket wheel $gj$ is connected by the chain $i$ to a sprocket $vi$ which is attached to the wheel $b$. A clutch $cl$ operates to engage the sprocket wheel $cw$ to the sprocket wheel $gj$ through the rod $l$ and rod $gs$. The levers $g$ and $g'$ with the reel shaft $z$ boxed in the ends and pivoted at $tn$, have a compensation spring $sa$ and $sa'$ adapted to counteract the weight of the reel. Rods $k$ and $k'$ connect the levers $g$ and $g'$ respectively at the ends opposite from the reel to the levers $e$ and $e'$ upon a shaft $d$, which is operated by a lever $a$ having a rack $r$, the lever $a$ being adapted to raise and lower the reel vanes relative to the striking board $fb$. Another lever $c$ placed near the seat of the operator engages through the member $p$ the frame $ln$ to tip the frame and box $y$ with reference to the tongue $t$ so as to raise and lower the striking board $fb$ with reference to the ground upon which the wheel $b$ runs. A tongue $t$ is arranged to be used with horses or tractor to pull the device along the ground.

When power is applied to the thrasher the wheel $b$ turns the sprocket wheel $vi$ which operates the sprocket $gj$. The mechanism is then thrown into gear by the rod $gs$ operating on the rod $l$ to operate the clutch $cl$ which throws the sprocket wheel $cw$ into motion. This operates through the chain $h$ the sprocket wheel $gw$, and through the chain $j$ the sprocket wheel $jw$, turning the reel having the blades $o$ $o$ $o$ $o$. The striking board $fb$ bunches the plants in front of it and the reel blades $o$ $o$ $o$ $o$ strike the heads or seed pods of the plants and break them off, or shell out the seed, which is thrown to the rear into the box $y$. Adjustment is made by the lever $a$ of the reel blades $o$ $o$ $o$ $o$ to the height of the plants to be seeded, while the lever $c$ operates to place the striking board $fb$ at the proper distance from the ground. A door $z$ is adapted to be opened in the rear of the box $y$ to take the seed therefrom.

In farming operations the use of sweet clover as a restorer of land has come to be used very generally. It is often pastured late in the season and is desirable to pasture it after it has gone to seed. By means of this machine seed may be taken from sweet clover left for pasture and then the whole plant plowed under as a restorer of the soil.

Our invention is adapted to the taking of grains or seed from any plant where it is desirable to leave the plant standing upon the ground. Box *y* is unloaded at proper intervals and the seed taken from it and carried away by wagons.

What we desire to secure by Letters Patent is:

1. In a seed thrasher, a pivotally mounted frame provided at its rear end with a seed receptacle, a striking bar carried by the frame and located at the front of the seed receptacle, a pair of levers disposed approximately horizontally and fulcrumed intermediate of their ends to form front and rear arms, a rotary thrashing wheel carried by the front arms of the said levers and cooperating with the striking bar, gearing for rotating the thrashing wheel, and means for adjusting the pivoted frame and the said levers for arranging the thrashing wheel and the striking bar in proper cooperative relation.

2. In a seed thrasher, a pivotally mounted frame provided at its rear end with a seed receptacle, a striking bar carried by the frame and located at the front of the seed receptacle, a pair of levers disposed approximately horizontally and fulcrumed intermediate of their ends to form front and rear arms, a rotary thrashing wheel carried by the front arms of the said levers and cooperating with the striking bar, gearing for rotating the thrashing wheel, compensating springs connected with the rear arms of the said levers, an adjusting lever connected with the rear arms of the levers for adjusting the thrashing wheel, and a separate adjusting lever connected with the pivoted frame for adjusting the striking bar.

MAX BEBENSEE.
WILL C. CHILDREN.
MERVIN MARTIN.